(12) United States Patent
Mantler

(10) Patent No.: US 10,405,003 B2
(45) Date of Patent: Sep. 3, 2019

(54) IMAGE COMPRESSION BASED ON SEMANTIC RELEVANCE

(71) Applicant: Google Inc., Mountain View, CA (US)

(72) Inventor: Anthony Mantler, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 29 days.

(21) Appl. No.: 15/411,203

(22) Filed: Jan. 20, 2017

(65) Prior Publication Data

US 2018/0213260 A1 Jul. 26, 2018

(51) Int. Cl.
| | | |
|---|---|---|
| *H04N 19/70* | (2014.01) | |
| *H04N 19/23* | (2014.01) | |
| *H04N 19/124* | (2014.01) | |
| *H04N 19/136* | (2014.01) | |
| *H04N 19/167* | (2014.01) | |
| *H04N 19/137* | (2014.01) | |
| *H04N 19/17* | (2014.01) | |
| *H04N 19/20* | (2014.01) | |
| *H04N 19/85* | (2014.01) | |

(52) U.S. Cl.
CPC ........... *H04N 19/70* (2014.11); *H04N 19/124* (2014.11); *H04N 19/136* (2014.11); *H04N 19/137* (2014.11); *H04N 19/167* (2014.11); *H04N 19/17* (2014.11); *H04N 19/20* (2014.11); *H04N 19/23* (2014.11); *H04N 19/85* (2014.11)

(58) Field of Classification Search
CPC .... H04N 19/124; H04N 19/17; H04N 19/167; H04N 19/119; H04N 19/13; H04N 19/14; H04N 19/20; H04N 19/57; H04N 19/60; H04N 21/2662; H04N 21/44008
See application file for complete search history.

(56) References Cited

U.S. PATENT DOCUMENTS

| | | | | |
|---|---|---|---|---|
| 6,175,829 | B1 * | 1/2001 | Li | ...................... G06F 17/30247 |
| 6,970,602 | B1 * | 11/2005 | Smith | ............ H04N 21/234336 |
| | | | | 375/E7.137 |
| 8,929,459 | B2 | 1/2015 | Massimino | |
| 9,172,967 | B2 | 10/2015 | Lou et al. | |
| 2003/0007696 | A1 * | 1/2003 | Saito | ....................... G06T 9/007 |
| | | | | 382/239 |
| 2010/0119157 | A1 * | 5/2010 | Kameyama | .......... H04N 19/115 |
| | | | | 382/195 |
| 2012/0069897 | A1 | 3/2012 | Anselmo et al. | |

(Continued)

FOREIGN PATENT DOCUMENTS

| | | |
|---|---|---|
| EP | 0735773 A1 | 10/1996 |
| WO | 0046999 A1 | 8/2000 |

(Continued)

OTHER PUBLICATIONS

International Search Report and Written Opinion for International Application No. PCT/US2017/059301, dated Feb. 6, 2018, 11 pages.

*Primary Examiner* — Kim Y Vu
*Assistant Examiner* — Michael J Vanchy, Jr.
(74) *Attorney, Agent, or Firm* — Brake Hughes Bellermann LLP

(57) ABSTRACT

A method includes: receiving an image in a system; identifying, using the system, a portion of the received image that is semantically relevant; and compressing, using the system, the received image based on the identified portion.

20 Claims, 6 Drawing Sheets

(56) References Cited

U.S. PATENT DOCUMENTS

| | | | |
|---|---|---|---|
| 2012/0229694 A1* | 9/2012 | Steinberg | H04N 5/23212 348/352 |
| 2013/0051756 A1* | 2/2013 | Chao | H04N 21/44008 386/241 |
| 2016/0080743 A1 | 3/2016 | Kerr et al. | |
| 2016/0080746 A1* | 3/2016 | Jun | H04N 19/167 375/240.08 |

FOREIGN PATENT DOCUMENTS

| | | |
|---|---|---|
| WO | 2009014156 A1 | 1/2009 |
| WO | 2010057170 A1 | 5/2010 |

* cited by examiner

IMAGE COMPRESSION BASED ON SEMANTIC RELEVANCE

TECHNICAL FIELD

This document relates, generally, to image compression that is based on semantic relevance.

BACKGROUND

Compression of digital image content is performed to reduce the content size to facilitate more efficient transmission and storage of the image. Existing compression techniques for images or image sequences use algorithms that analyze the image frame or frame sequences as a whole without consideration to the contents of the image. The technique may then apply a lossy compression to discard as much data as possible without significantly compromising image quality. This can lead to overcompressing important content and/or undercompressing unimportant content.

For example, in video compression the encoder may be given leeway to choose what areas of an image to update with what fidelity. Moreover, there is flexibility in how sequential frames are represented, in that for a particular frame there can be delivered data that essentially constitutes a resolvable photograph, or the frame can be defined based on previous and/or future frames in the sequence. Regardless, a single level of compression is typically applied. Such image compression decisions are usually made based on a whole-image quality metric. For example, the goal can be to avoid occurrence of excessive artifacts in the center of the image, or at the edges. That is, the same level of compression is applied throughout the image.

SUMMARY

In a first aspect, a method includes: receiving an image in a system; identifying, using the system, a portion of the received image that is semantically relevant; and compressing, using the system, the received image based on the identified portion.

Implementations can include any or all of the following features. Compressing the received image based on the identified portion comprises weighting a compression function based on the identified portion. Compressing the received image based on the identified portion comprises applying quantization to the received image based on the identified portion. Applying the quantization comprises quantizing image information from the identified portion of the received image to a first set of integers, and quantizing image information that is not from the identified portion to a second set of integers, wherein the quantization is configured so that the first set is larger than the second set. The image information from the identified portion is quantized to a nearest integer value, and the image information that is not from the identified portion is quantized to a nearest Nth integer value, wherein N is a predefined number. Identifying the portion of the received image that is semantically relevant comprises applying a face-tracking function to the received image. Identifying the portion of the received image that is semantically relevant comprises applying an object recognition function to the received image. Identifying the portion of the received image that is semantically relevant comprises targeting a predefined location in the received image. Identifying the portion of the received image that is semantically relevant comprises determining a relative size of an object in the received image. Identifying the portion of the received image that is semantically relevant comprises analyzing a movement of an object in the received image. Analyzing the movement of the object comprises determining a speed of the object in the received image. Identifying the portion of the received image that is semantically relevant comprises estimating an encoding complexity for an area of the received image. Autofocus data relating to the image indicates an autofocus location in the image, and wherein the portion of the received image that is semantically relevant is identified based on the autofocus location.

In a second aspect, a computer program product is tangibly embodied in a non-transitory computer-readable medium and includes executable instructions that, when executed, cause a computing device to perform operations including: receiving an image; identifying a portion of the received image that is semantically relevant; and compressing the received image based on the identified portion.

In a third aspect, a system includes: a storage containing an image; image analysis circuitry configured to identify a portion of the image that is semantically relevant; and image compression circuitry configured to compress the image based on the identified portion.

Implementations can include any or all of the following features. The system further includes transformation circuitry configured to perform a transform on the image. The image compression circuitry is configured to perform quantization and rounding of image data, and to weight at least one of the quantization and the rounding based on the identified portion. The system further includes an image template, wherein the image analysis circuity is configured to use the image template in identifying the portion of the image that is semantically relevant. The image compression circuity is configured to perform object recognition on the image in identifying the portion of the image that is semantically relevant. The system further includes autofocus circuitry configured to generate autofocus data relating to the image, the autofocus data indicating an autofocus location in the image, and wherein the image analysis circuitry identifies the portion of the image that is semantically relevant based on the autofocus location.

BRIEF DESCRIPTION OF DRAWINGS

Like reference symbols in the various drawings indicate like elements.

DETAILED DESCRIPTION

This document describes examples of image compression based on semantic relevance. In some implementations, image analysis is performed to identify at least one area of an image that is deemed to be of higher relevance than another area or a remainder of the image. Based on this identification, one can apply relatively less image compression in the identified area than elsewhere, or conversely, more compression in the other area(s) than in the identified area. This can allow a system to retain more data in an area of interest, and to discard more data in an area of low interest.

Figure 1:
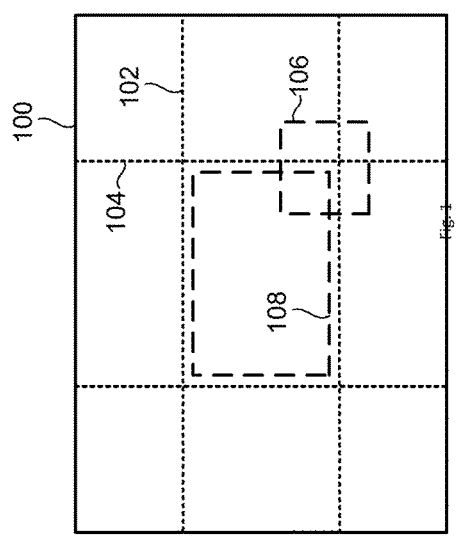
FIGS. 1-3 show examples of analyzing images for semantically relevant content.
Figure 3:
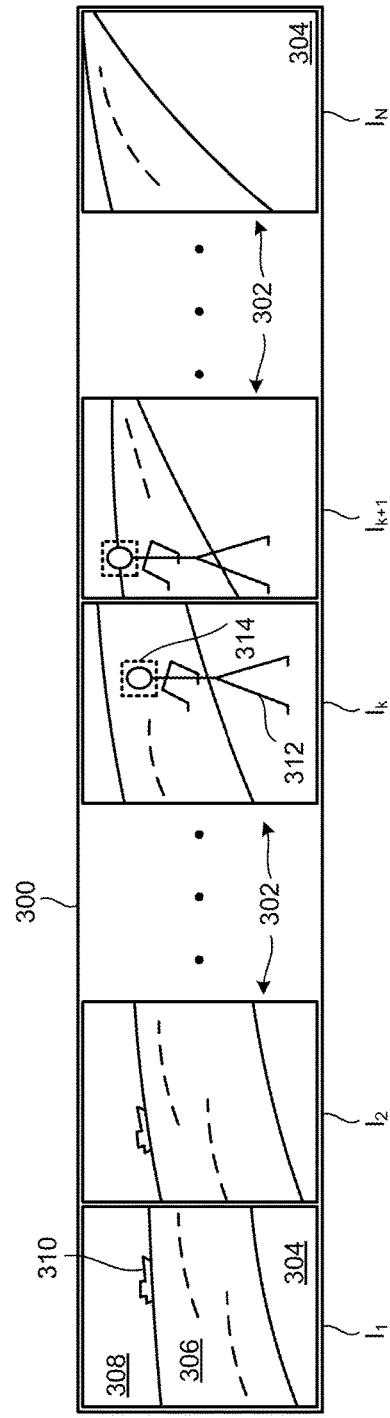
Figure 2:
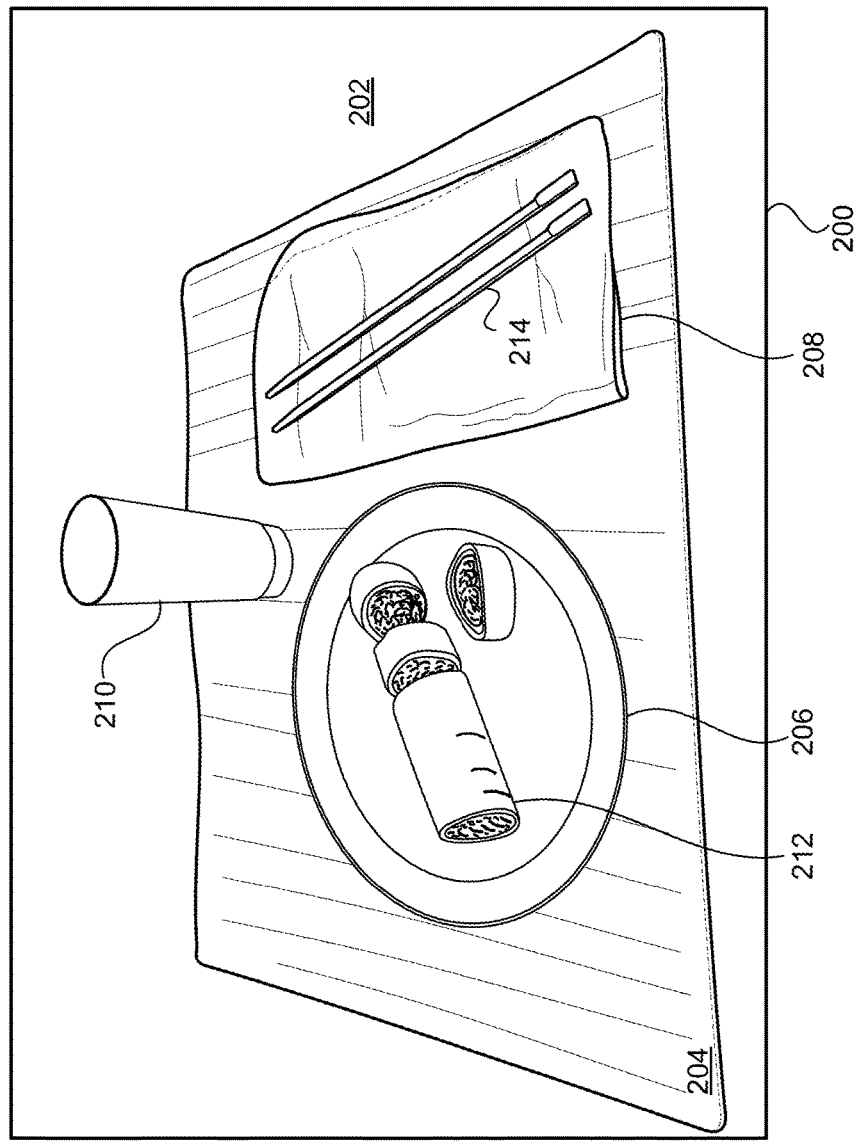

FIGS. 1-3 show examples of analyzing images for semantically relevant content. FIG. 1 schematically shows an image 100. The image can be formed as an array of one or more types of image values that represent the image by defining its content. For clarity, the image content is not explicitly shown in this illustration. The image can be stored using any image format, including, but not limited to, as a JPEG image.

Here, lines relating to image composition are indicated in the image 100. That is, horizontal lines 102 are equally spaced from each other and from the image's top and bottom edges, and vertical lines 104 are likewise equally spaced from each other and from the image's left and right edges. The lines 102-104 form a guide that is sometimes referred to as the rule of thirds: they divide the horizontal and vertical spans of the image into thirds. One rule of thumb for image composition suggests that important compositional elements should be placed along these lines. As such, the lines may not be part of the image 100 as such, but are shown here for illustrative purposes.

The image 100 can be analyzed or otherwise processed for the purpose of determining areas therein that are semantically interesting or otherwise of relevance. In some implementations, the lines 102-104 can be used. For example, an area 106 can be selected that sits at the intersection of two of the lines 102-104. The area 106 can have any shape, including, but not limited to, rectangular. This example shows that a predefined location in the image can be identified as being semantically relevant. Other selections can be made based on the lines 102-104.

One or more other areas of the image can be identified as having semantical relevance. In some implementations, a center of the image can be identified based on the frequently occurring situation that the image is centered around the item or view that is of most interest. For example, an area 108 can be identified based on the center of the image. The area 108 can have any shape, including, but not limited to, rectangular.

The identification of an image area can be used for one or more purposes. In some implementations, image compression is performed based on the identified area(s). For example, less compression can be applied in the identified area(s) than elsewhere in the image. As such, in some implementations a method can be performed that includes: receiving an image in a system; identifying, using the system, a portion of the received image that is semantically relevant; and compressing, using the system, the received image based on the identified portion.

FIG. 2 shows an example of an image 200 showing a served meal, such as at a restaurant. The image 200 shows a tabletop 202, a placemat 204 resting on the tabletop, and on the placemat, a plate 206, a napkin 208 and a glass 210. On top of the plate 206 is a food item 212 such as a sushi roll, and on top of the napkin 208 are chopsticks 214.

Image processing can be performed to recognize objects in the image 200. For example, an object recognition function can be applied to the image 200 to recognize one or more of the objects 202-214. For example, algorithms of the object recognition function can be trained on an image base to recognize generic shapes of items, such as plates, glasses, and so on. The recognized object can be used to determine what area(s) of the image 200 are more or less semantically relevant. For example, the image base can contain many instances where an image depicts a food item such as the sushi 212, but relatively few instances of images that depict items such as the napkin 208. Based on this, the algorithm can be tailored to regard the sushi 212 as semantically more relevant than the napkin 208, to name just one example of a pair of objects in the image 200. A similar evaluation can be performed for any other set of objects, consisting of two or more of the objects, until the algorithm has determined the more relevant object(s) and the less relevant object(s). The information regarding semantic relevance can then be used to determine how to compress the image 200.

One or more images from an image sequence can be subjected to analysis for semantic relevance for purposes of tailoring the level of compression throughout the image. FIG. 3 shows an example of an image sequence 300. The image sequence 300 includes images 302 that are here shown side by side for illustrative purposes. For example, the image sequence 300 constitutes a video clip that was recorded over a specific period of time, such as a few seconds. Here, an arbitrary number N of the images 302 are part of the image sequence 300. That is, the image sequence here includes respective images $I_1$ through $I_N$, of which images $I_1$, $I_2$, $I_k$, $I_{k+1}$, and $I_N$ are shown.

Assume, for example, that the image sequence 300 is taken at a beach. In particular, the photographer performed a sweeping motion with the camera (e.g., a smartphone) while capturing the video clip, such that a succession of beach and ocean views are captured in a continuous fashion. For example, the image $I_1$ includes image content corresponding to a beach 304, an ocean 306 beyond the beach, a sky 308 above the ocean, and a ship 310 on the horizon. In image $I_2$, moreover, the items have moved somewhat due to the panning of the camera.

In image $I_k$, a person 312 has appeared in the image sequence. The person can be recognized as semantically relevant image content. In some implementations, the size of the person 312 relative to the rest of the image $I_k$ can be determined. For example, objects that appear large can indicate that the photographer considered them to be semantically relevant. As such, the height, width, and/or area of the person 312 can be determined and compared to the entire size of the image $I_k$.

Movement of an object in the image can be used to determine that the object is semantically relevant. In some implementations, the apparent movement of the person 312 from image $I_k$ to image $I_{k+1}$ can be determined and used as a signal of semantic relevance such that relatively less compression is applied to that image content. For example, the speed of the object can be determined and taken into account. The movement is determined relative to the framework defined by the image. As such, the movement can appear because the object is actually moving as the image is captured, or because the camera is being moved in between successive image captures, or both.

Face tracking technology can be used to determine semantic relevance. For example, a face tracking function can be applied to the images 302. While no face is detected in the images $I_1$ and $I_2$, in the image $I_k$ the face of the person 312 can be detected. For example, a marker 314 can then be applied to the face. That is, the face tracking function can detect that a face (or the person's body) appears in the image, and this information can be used to identify an area as semantically relevant.

Object recognition technology can be used to determine semantic relevance. In analogy with the above example in FIG. 2, an object recognition function can be applied to the images 302. When the person 312 is detected and recognized as a person as opposed to, say, the beach or the ocean, the system can classify the person 312 as being image content that is semantically relevant.

Complexity of encoding can be used as a measure of semantic relevance. In some implementations, a function can be applied to an image that estimates how complex the encoding process will be for the various parts of the image. For example, in the image $I_1$ the beach 304 and the sky 308 are relatively uniform visually and therefore may be relatively less complex to encode. In the image $I_k$, on the other hand, the person 312 may be rich in texture and feature many different details, shades, contrasts and/or levels of brightness. As such, the person 312 can be relatively more complex to encode. Therefore, the encoding complexity can be used to determine which areas of the image should be compressed to a greater or lesser extent. For example, high coding complexity can indicate that relatively more image information should be preserved, and vice versa.

An autofocus function can be used to identify a semantically relevant image portion. The fact that the photographer chose to take the picture at the moment when the autofocus function had selected a particular subject to be placed in focus can indicate that this subject may have semantic relevance. For example, the marker 314 on the head of the person 312 can be an autofocus location defined by autofocus circuitry in the camera/lens system. This information about the location of the autofocus can be used to classify that image as being semantically relevant.

FIGS. 4-8 show examples of systems. These examples involve block diagrams where some system components are shown in block form. The block represents one or more circuits or other system components implemented to perform operations, including those explicitly described. In some implementations, a block can include at least a processor and memory configured to store instructions for the processor. For example, a computer program product can have stored therein instructions to be read and executed by the processor. The organization of blocks is here made for illustrative purposes only. In some implementations, two or more blocks can be combined into a common unit. Also, or instead, more or fewer blocks than those shown here can be used.

Figure 4:
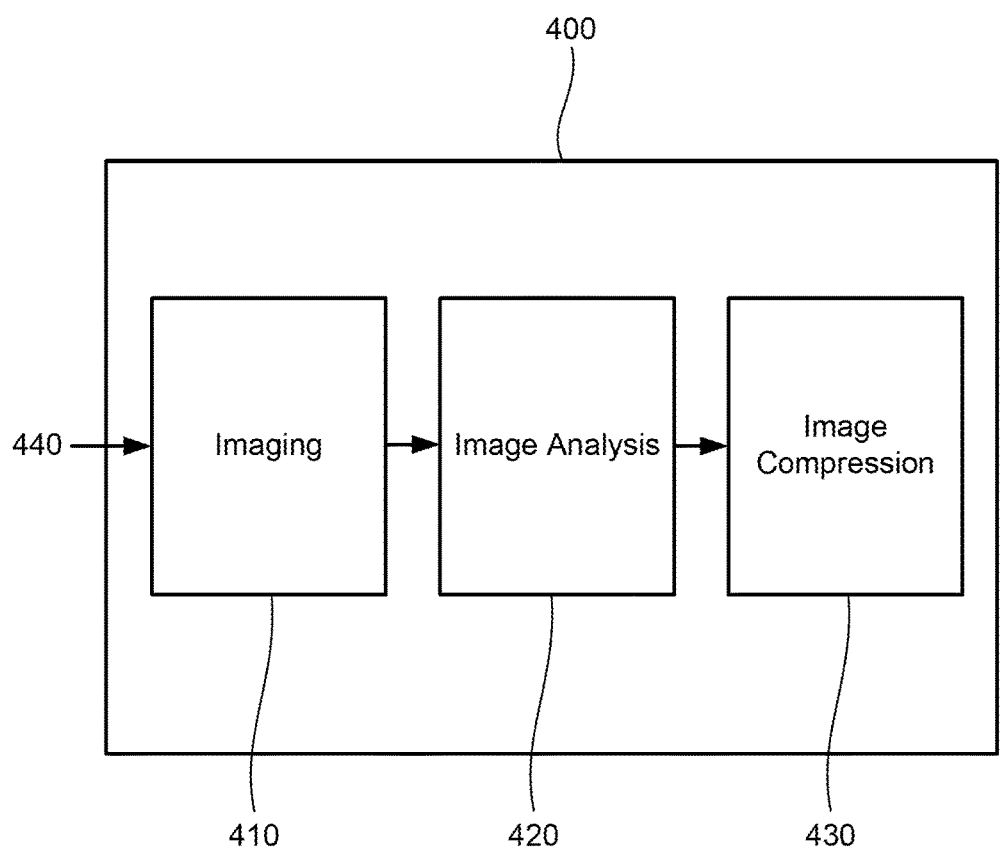
FIGS. 4-8 show examples of systems.

FIG. 4 shows an example of a system 400 that can be used for image processing. The system 400 here includes an imaging component 410, an image analysis component 420 and an image compression component 430. For example, the system 400 can be part of a camera, such as in a smartphone or in a separate camera unit. The imaging component 410 detects light as schematically indicated by arrow 440 and generates an image signal in electronic form, such as using an image sensor and related circuitry. The generated signal can be provided to the image analysis component 420, which processes it to identify at least one portion of the image that is semantically relevant, for example according to one or more of the ways described herein. The image compression component 430, moreover, receives the image signal from the image analysis component 420 or directly from the imaging component 410. The image compression component 430 also receives information from the image analysis component 420 about the identified portion(s) of the image. The image compression component then compresses the image based on the identified portion(s). For example, the image compression component 430 can have one or more compression functions suitable for use on images, and it/they can be weighted based on which portion(s) of the image the image analysis component 420 identified.

Figure 5:
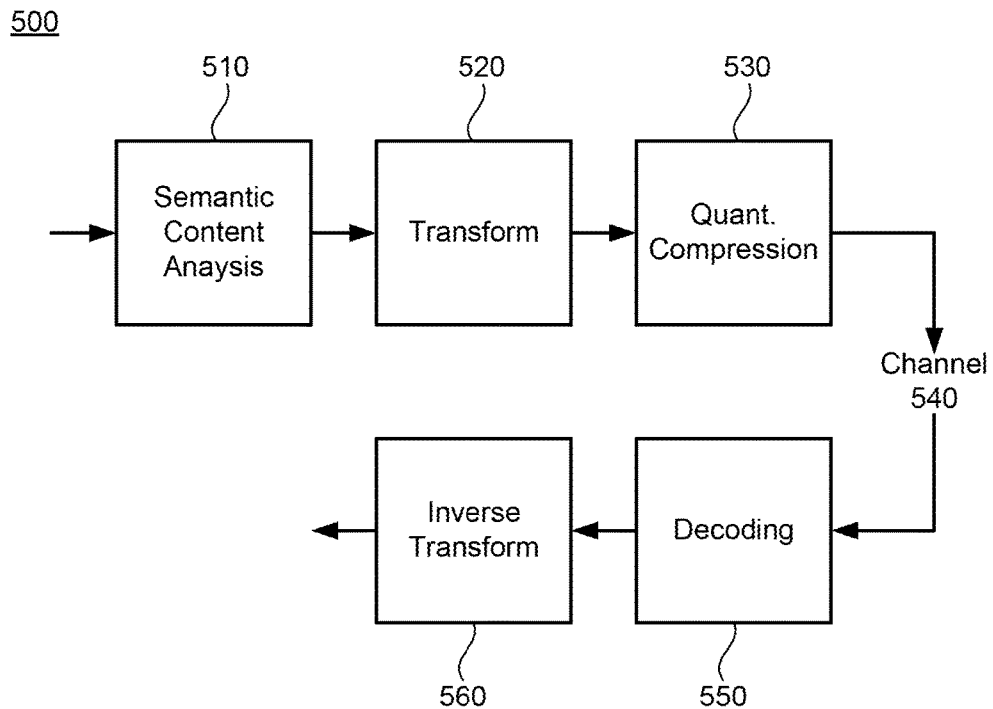

FIG. 5 shows an example of a system 500 that can be used for coding and decoding of images. In some implementations, components 510, 520 and 530 perform operations to generate an encoded image, and that image can then be forwarded in one or more channels 540. For example, a wired or wireless transmission of the coded image can be performed. Components 550 and 560 can then generate a decoded image from the received encoded image. For example, the decoded image can be presented to a viewer, such as on a monitor or other display.

In particular, the component 510 performs semantic content analysis on the image. Any or all of the approaches described herein can be used. The component 510 identifies a portion of the image that is semantically relevant, based on its analysis of the image. The component 520, moreover, performs a transform on the image data. The transform creates a separate representation of the image based on its content, such as in the frequency domain. For example, a Discrete Cosine Transform (DCT) can be performed.

The component 530 performs quantization and compression of the image content based on the identified portion(s). In some implementations, the quantization involves applying a quantization matrix or coefficients in another form to the values of the image data. Areas of high relevance can be quantized to a first set of integers, and areas of lesser relevance can be quantized to a second set of integers, where the first set is larger than the second set. For example, areas of high relevance can be quantized to the nearest integer, and areas of lesser relevance can be quantized to the nearest Nth integer, where N is a predefined number. As another example, relevant areas can be quantized to the nearest integer, and in the less relevant areas a modified integer set can be used that omits some integers according to a particular pattern, such as the set 1, 2, 4, 5, 7, 8, . . . . Other integer sets can be used for quantization. A rounding of obtained values can be performed. Compression is performed such that less compression is applied in the identified portion(s) than elsewhere in the image.

After the encoded image is provided through the channel 540, the component 550 can perform decoding. For example, this can be done in an opposite way of how the encoding was done by the component 530. Similarly, the component 560 can perform essentially the inverse transform compared to the one applied by the component 520. For example, the inverse DCT can be performed.

Figure 6:
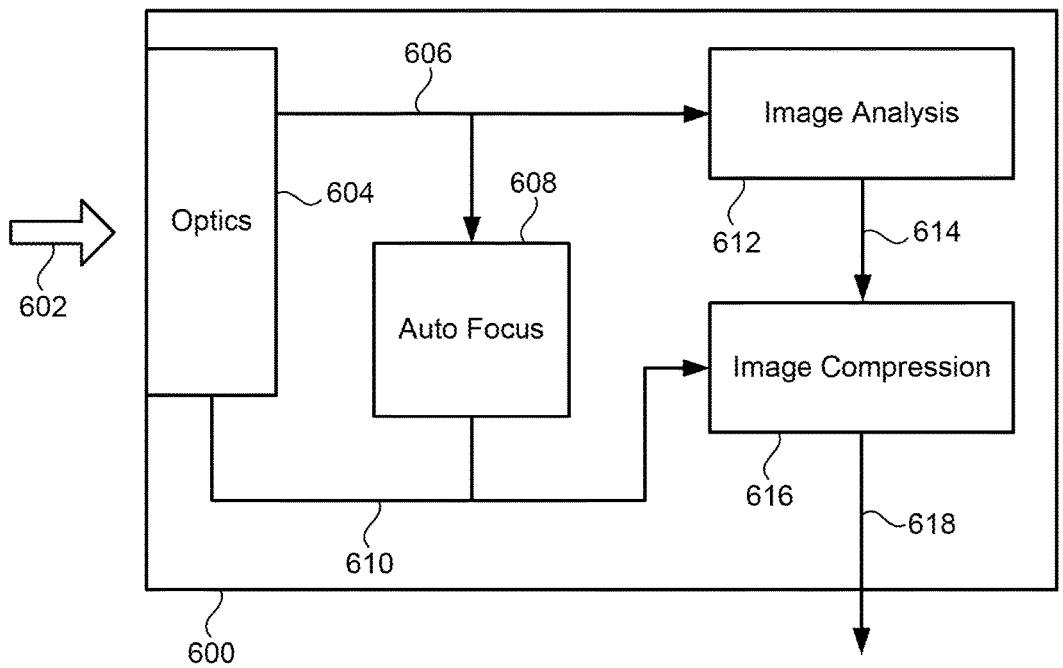

FIG. 6 shows an example of a system 600 that can use autofocus data to identify a semantically relevant portion of an image. Arrow 602 schematically illustrates light being captured by the system 600 which can be implemented in a camera to name just one example. The system 600 includes optics component 604 that receives the captured light. For example, one or more lenses and image sensing circuitry can be included in the optics component 604. An arrow 606 indicates an image output signal from the optics component 604. One recipient of the output signal from the optics component 604 is autofocus circuitry 608. For example, the autofocus circuitry can choose between items in the image that are at different distances from the system 600, to define an autofocus location for the optics component 604 to use in adjusting the lens(es) for a proper exposure. An arrow 610 indicates an autofocus data output from the autofocus circuitry 608. One recipient of the autofocus data output is the optics component 604, which can adjust its settings accordingly.

The arrow 606 indicates that the image output signal from the optics component 604 is also received by an image analysis component 612. The image analysis component 612 analyses the captured image and identifies one or more portions thereof as being semantically relevant. An arrow 614 here indicates that image content and the information identifying the semantically relevant portion(s) are provided to an image compression component 616. The image compression component 616 compresses the image based on the identified portion(s). As such, the image compression component 616 receives autofocus data from the autofocus circuitry 608, as indicated by the arrow 610. The semantically relevant portion can be identified based on the autofocus location in the image. In some implementations, the image compression component 616 can receive image data directly from the optics component 604.

Arrow 618 indicates that the image compression component 616 can provide a compressed and encoded image to a component (not shown) outside the system 600, including, but not limited to, a storage such as a memory, or a communication component for transmission.

Figure 7:
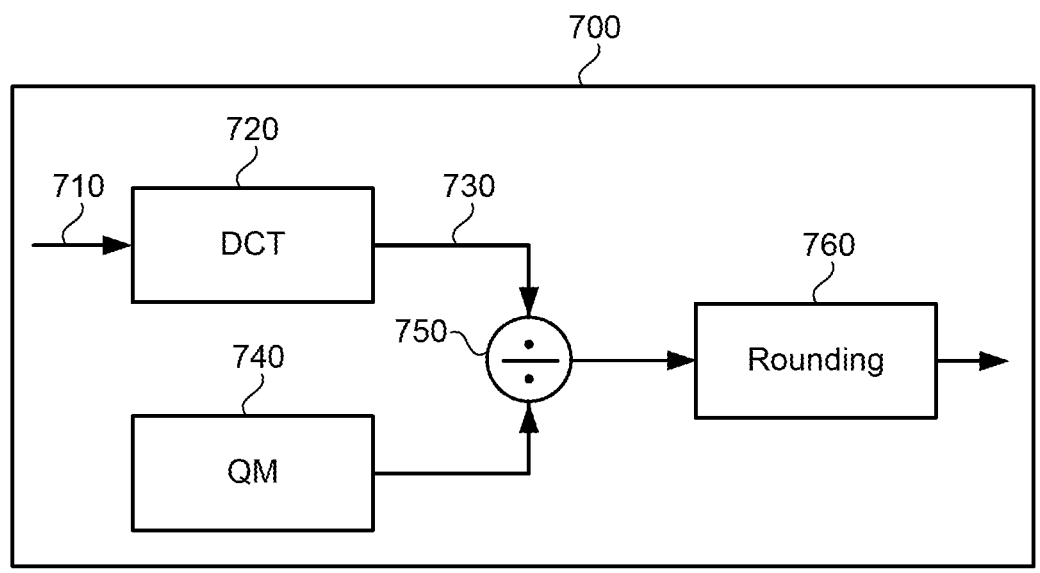

FIG. 7 shows an example of a system 700 that can perform quantization and rounding as part of processing an image. An arrow 710 indicates that image content is provided to the system 700. For example, a macroblock section can be selected, such as to comprise 8×8 pixels. The image content (e.g., the 8×8 pixel block) is subjected to a DCT 720. For example, the DCT 720 can generate an 8×8 matrix of values based on a macroblock section. An arrow 730 indicates the matrix generated by the DCT 720.

A quantization matrix (QM) 740 can be provided. The QM includes coefficients configured for use in quantizing the values generated by the DCT 720. In some implementations, the QM 740 can be applied to all or some of an entire color channel of the image. For example, a large-value QM indicates that the DCT values will be quantized into relatively few values. Conversely, a small-value QM indicates that the DCT values will be quantized into a relatively wider range of values. A division function 750 indicates a division operation involving the matrix from the DCT 720 and the QM 740. For example, each element of the matrix from the DCT 720 can be divided by a corresponding element from the QM 740. An output from the division function 750 can be subjected to a rounding function 760. For example, the values can be brought to the nearest integer value so as to eliminate bits for floating point information.

The system 700 can apply compression based on semantically relevant image portions. In some implementations, the system 700 can weigh the compression function so as to apply less compression in the relevant portion than in the other portion(s), or vice versa. Compression and/or rounding can be weighted. For example, the QM factor can be divided in half, and the rounding can be done to the nearest even integer instead of to the nearest integer. The result can be that once Huffman coding has been done as part of the image compression, one has the same number of bits representing all the values, but they are spread out across the image. For example, in one image portion that uses only the even integers a small amount of data is used, and in an area of determined relevance even and odd integers are used to get more definition in that area. This approach can allow a higher quality QM 740 to be used so that the image quality in the areas of high viewer interest is increased without significantly increasing the size of the compressed data.

Figure 8:
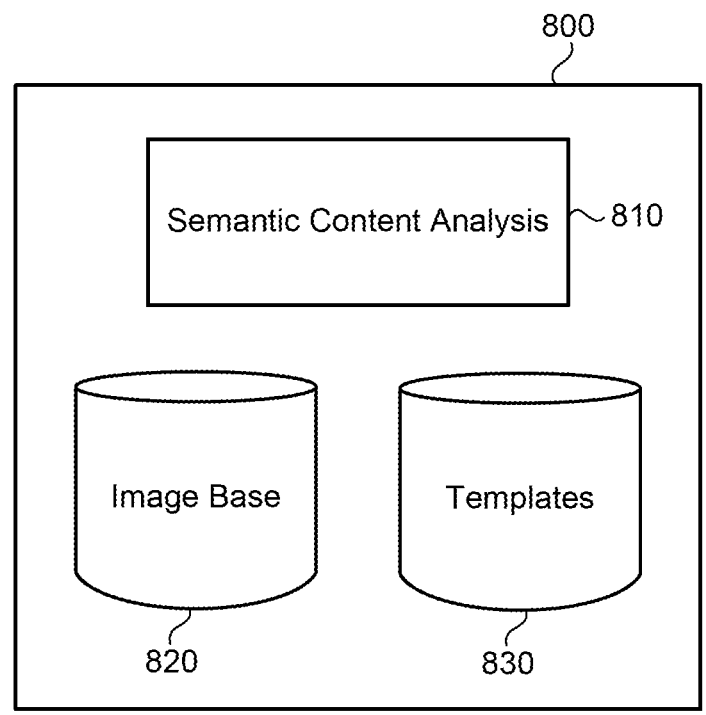

FIG. 8 shows an example of a system 800 that can be used for image processing. A semantic content analysis component 810 can determine semantically relevant areas of images using any or all approaches described herein. One such approach is that the semantic content analysis component 810 is trained to recognize semantically relevant content based on an existing collection of images. Image base 820 is a storage of digital images that can be used for this purpose. The semantic content analysis component 810 can analyze images in the image base 820 as to the objects depicted therein. For example, if one type of object (e.g., a sushi roll) is depicted significantly more often in the image base 820 than another type of object (e.g., a napkin), then the semantic content analysis component 810 can deduce that the former object is more semantically relevant than the latter.

The semantic content analysis component 810 can use templates 830 in determining semantically relevant image content. The template can specify a predefined portion of the image as being semantically relevant. For example, the center of the image or a rule-of-thirds area can be specified. Thus, one or more of the templates 830 can be applied to an image by the semantic content analysis component 810.

Figure 9:
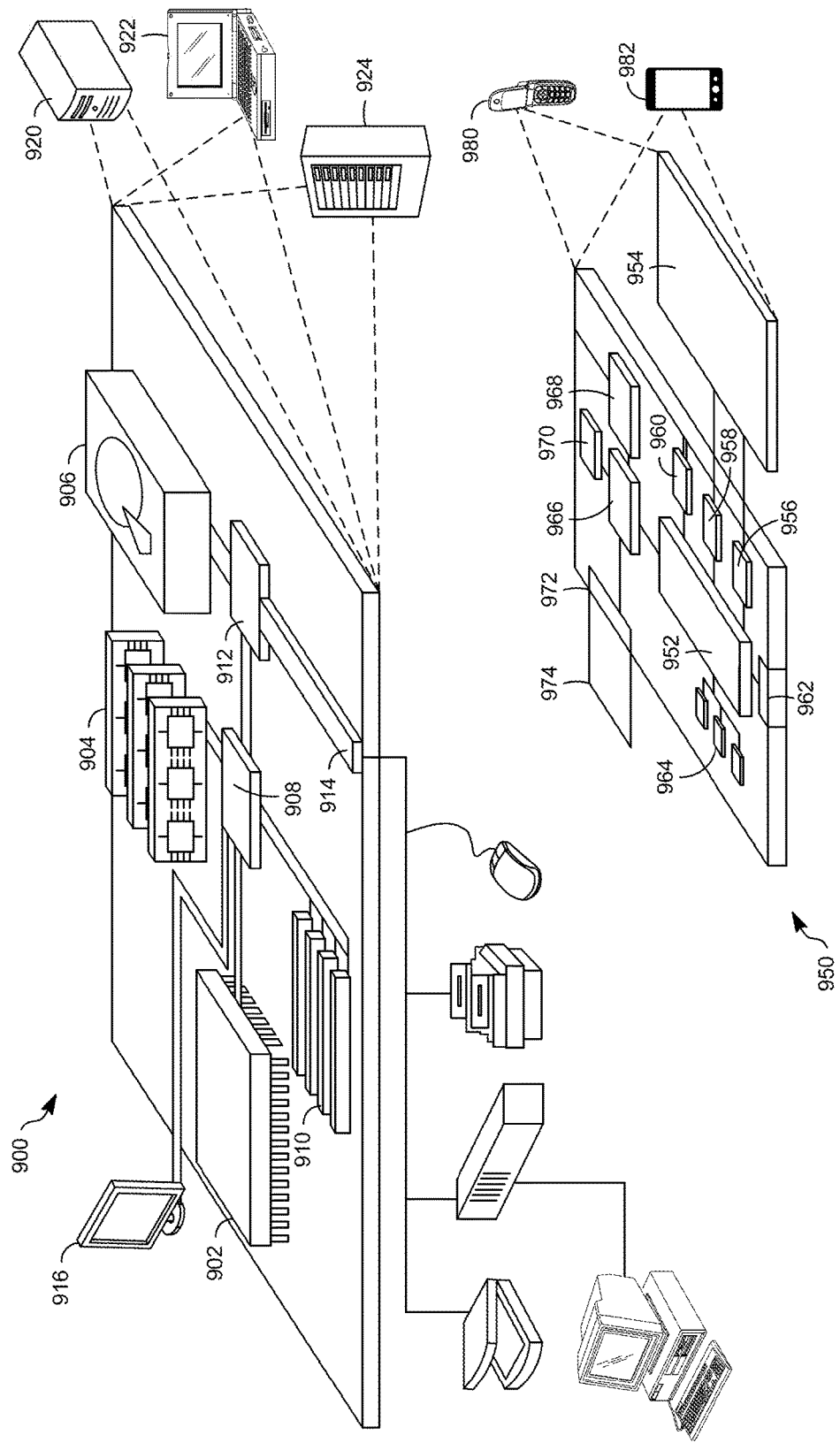
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving an image in a system;
   identifying, using the system, a portion of the received image that is semantically relevant, wherein identifying the portion comprises:
   identifying at least first and second objects in the received image;
   accessing an existing collection of images in an image base; and
   determining which of the objects occurs more often in the image base, wherein
   the portion of the received image is identified based on the determination; and
   compressing, using the system, the received image, wherein the identified portion is compressed less than another portion of the received image.

2. The method of claim 1, wherein compressing the received image based on the identified portion comprises weighting a compression function based on the identified portion.

3. The method of claim 1, wherein compressing the received image based on the identified portion comprises applying quantization to the received image based on the identified portion.

4. The method of claim 3, wherein applying the quantization comprises quantizing image information from the identified portion of the received image to a first set of integers, and quantizing image information that is not from the identified portion, including the other portion of the received image, to a second set of integers, wherein the quantization is configured so that the first set is larger than the second set.

5. The method of claim 4, wherein the image information from the identified portion is quantized to a nearest integer value, and the image information that is not from the identified portion is quantized to a nearest Nth integer value, wherein N is a predefined number.

6. The method of claim 1, wherein identifying the portion of the received image that is semantically relevant comprises applying a face-tracking function to the received image.

7. The method of claim 1, wherein identifying the portion of the received image that is semantically relevant comprises applying an object recognition function to the received image.

8. The method of claim 1, wherein identifying the portion of the received image that is semantically relevant comprises targeting a predefined location in the received image.

9. The method of claim 1, wherein identifying the portion of the received image that is semantically relevant comprises determining a relative size of an object in the received image.

10. The method of claim 1, wherein identifying the portion of the received image that is semantically relevant comprises analyzing a movement of an object in the received image.

11. The method of claim 10, wherein analyzing the movement of the object comprises determining a speed of the object in the received image.

12. The method of claim 1, wherein identifying the portion of the received image that is semantically relevant comprises estimating an encoding complexity for an area of the received image.

13. The method of claim 1, wherein autofocus data relating to the received image indicates an autofocus location in the received image, and wherein the portion of the received image that is semantically relevant is identified based on the autofocus location.

14. A computer program product tangibly embodied in a non-transitory computer-readable medium and including executable instructions that, when executed, cause a computing device to perform operations including:
   receiving an image;

identifying a portion of the received image that is semantically relevant, wherein identifying the portion comprises:
  identifying at least first and second objects in the received image
  accessing an existing collection of images in an image base; and
  determining which of the objects occurs more often in the image base, wherein
the portion of the received image is identified based on the determination; and
compressing the received image, wherein the identified portion is compressed less than another portion of the received image.

15. A system comprising:
a storage containing a received image;
image analysis circuitry configured to identify a portion of the image that is semantically relevant, the image analysis circuitry configured to identify at least first and second objects in the received image, access an existing collection of images in an image base, and determine which of the objects occurs more often in the image base, wherein the portion of the received image is identified based on the determination; and
image compression circuitry configured to compress the received image based on the identified portion, wherein the identified portion is compressed less than another portion of the received image.

16. The system of claim 15, further comprising transformation circuitry configured to perform a transform on the received image.

17. The system of claim 15, wherein the image compression circuitry is configured to perform quantization and rounding of image data, and to weight at least one of the quantization and the rounding based on the identified portion.

18. The system of claim 15, further comprising an image template, wherein the image analysis circuity is configured to use the image template in identifying the portion of the received image that is semantically relevant.

19. The system of claim 15, wherein the image compression circuity is configured to perform object recognition on the received image in identifying the portion of the received image that is semantically relevant.

20. The system of claim 15, further comprising autofocus circuitry configured to generate autofocus data relating to the received image, the autofocus data indicating an autofocus location in the received image, and wherein the image analysis circuitry identifies the portion of the received image that is semantically relevant based on the autofocus location.

* * * * *